United States Patent [19]

Nakamura et al.

[11] Patent Number: 5,262,870
[45] Date of Patent: Nov. 16, 1993

[54] IMAGE SENSOR IN WHICH READING AND RESETTING ARE SIMULTANEOUSLY PERFORMED

[75] Inventors: Kenichi Nakamura, Isehara; Hayao Ohzu, Fuchu; Isamu Ueno, Atsugi, all of Japan

[73] Assignee: Canon Kabushiki Kaisha, Tokyo, Japan

[21] Appl. No.: 860,587

[22] Filed: Mar. 30, 1992

Related U.S. Application Data

[63] Continuation of Ser. No. 476,769, Feb. 8, 1990, abandoned.

[30] Foreign Application Priority Data

Feb. 10, 1989 [JP] Japan .................... 1-30017
Apr. 10, 1989 [JP] Japan .................... 1-87892

[51] Int. Cl.$^5$ .................... H04N 3/14; H04N 5/335; H04N 3/12
[52] U.S. Cl. .................... 358/212; 358/213.11; 358/213.31; 358/483
[58] Field of Search ........... 358/482, 483, 212, 213.11, 358/213.22, 213.23, 213.26, 213.27, 213.29, 213.31, 241, 213.19, 213.18, 213.13; 377/61–63; 357/24 LR; 250/208.1; 382/58, 67

[56] References Cited

U.S. PATENT DOCUMENTS

| | | | |
|---|---|---|---|
| 4,445,117 | 4/1989 | Gaalema et al. | 340/825.91 |
| 4,500,927 | 2/1985 | Ozawa | 358/293 |
| 4,564,766 | 1/1986 | Kuroda et al. | 250/578 |
| 4,566,041 | 1/1986 | Shimano | 358/284 |
| 4,593,319 | 6/1986 | Kadedodi | 358/213 |
| 4,620,232 | 10/1986 | Tisue | 358/213.31 |
| 4,745,480 | 5/1988 | Kinugasa et al. | 358/213.18 |
| 4,751,559 | 6/1988 | Sugawa et al. | 357/30 |
| 4,819,070 | 4/1989 | Hynecek | 358/213.11 |
| 4,827,345 | 5/1989 | Nakagawa et al. | 358/213.27 |
| 4,831,451 | 5/1989 | Hynecek | 358/213.11 |
| 4,851,917 | 7/1989 | Ohzu | 358/213.22 |
| 4,953,028 | 8/1990 | Murayama et al. | 358/213.31 |
| 4,954,703 | 9/1990 | Ohzu | 250/200.1 |
| 4,958,085 | 9/1990 | Hashimoto et al. | 307/262 |
| 4,985,775 | 1/1991 | Murayama et al. | 358/213.13 |
| 4,989,075 | 1/1991 | Ito | 358/41 |
| 5,023,443 | 6/1991 | Komatsu et al. | 250/208.1 |
| 5,109,440 | 9/1992 | Kawahara et al. | 382/67 |

FOREIGN PATENT DOCUMENTS

| | | |
|---|---|---|
| 0253678 | 1/1988 | European Pat. Off. . |
| 0260956 | 3/1988 | European Pat. Off. . |
| 59-140766 | 8/1984 | Japan . |
| 0211375 | 11/1984 | Japan .................... 358/212 |
| 0184865 | 7/1989 | Japan .................... 358/212 |

*Primary Examiner*—Victor R. Kostak
*Assistant Examiner*—Safet Metjahic
*Attorney, Agent, or Firm*—Fitzpatrick, Cella, Harper & Scinto

[57] ABSTRACT

An image sensor chip comprises a plurality of output lines to which signals from a plurality of light-receiving elements are output. A plurality of switches are respectively connected to the plurality of output lines. Outputs from the plurality of switches are commonly connected to a common output line. A plurality of reset circuits are respectively connected to the plurality of output lines.

16 Claims, 6 Drawing Sheets

IMAGE SENSOR IN WHICH READING AND RESETTING ARE SIMULTANEOUSLY PERFORMED

This application is a continuation of application Ser. No. 07/476,769 filed Feb. 8, 1990, now abandoned.

BACKGROUND OF THE INVENTION

1. Field of the Invention

The present invention relates to an image sensor and a photoelectric conversion apparatus using the same and, more particularly, to an image sensor having a plurality of light-receiving elements, and a photoelectric conversion apparatus having a plurality of image sensors each having an array of a plurality of light-receiving elements.

2. Related Background Art

In recent years, various types of sensors have been commercially available along with developments of semiconductor technology. One of these sensors extracts an electrical signal from each photosensor portion and performs image processing.

Conventional linear image sensors are very popular in facsimile machines, scanners, and digital copying machines. Such a linear image sensor is formed on a silicon wafer, and the sensor length is limited by the wafer size. It is difficult to form one image sensor having an array of a plurality of light-receiving elements, the overall length of which is equal to the length of an original. For this reason, an image on the original is reduced by directing light reflected by the original on an optical system. A reduced image is projected on the linear image sensor, thus reading the original image.

A reader having the reduction optical system described above requires a large space for the optical system. In addition, it is difficult to obtain a sufficiently high resolution in this reader.

In order to solve this problem, a multi-chip image sensor having a one-dimensional array of a plurality of linear image sensors is used.

FIG. 1 is a view illustrating a circuit arrangement of a conventional image sensor.

As shown in FIG. 1, light signals from light-receiving elements 6-1 to 6-n are selected by a control circuit 3 in synchronism with fundamental clock pulses and are sequentially read and output to a common output line 1.

A signal output onto the output line 1 is input to a light signal amplifier 4 through a reset circuit 5. The reset circuit 5 alternately performs resetting and read access. A signal amplified by the light signal amplifier 4 is output onto a common output line 2.

FIG. 2A is a circuit diagram showing a detailed arrangement of the reset circuit. FIG. 2B is a timing chart of waveforms of signals for driving the reset circuit and a waveform of an output signal from the reset circuit.

Referring to FIG. 2A, a transistor QS is a transistor for reading out a pixel signal Vo from the output line 1 to an output line 1a as an output signal Vout. A transistor QR is a transistor for resetting the output line 1. A control signal $\phi A$ is input to the gate electrode of the transistor QS, and a control signal $\phi B$ independent of the control signal $\phi A$ is input to the gate electrode of the transistor QR.

As shown in FIG. 2B, during a time interval t1 as an ON time of the signal $\phi A$, a pixel signal from the output line 1 is read and output to the output line 2 serving as an input line of the amplifier 4. During a time interval t2 as the ON time of the signal $\phi B$, the output line 1 is reset. In this manner, read access and resetting are alternately performed, and a duty ratio of the output signal becomes about 50%.

In the conventional example, however, since the pixel signals of each image sensor are synchronized with fundamental clock pulses, and read access and resetting are serially performed, the read signal has a maximum duty ratio of 50% or less. It is difficult to cope with fundamental clocks having higher frequencies.

When the number of pixels is increased and the sensor length is increased to obtain a higher resolution, a parasitic capacitance of a horizontal read line for reading a signal is increased, and read access of the light signal cannot be performed at a sufficiently high speed. The signal level is decreased, and an S/N ratio is also decreased. In order to solve these problems, multi-line read access is developed and used in some fields of practical applications.

FIG. 3 is a schematic view showing an arrangement of a multi-line read system.

Referring to FIG. 3, a one-line sensor 301 is divided into a plurality of blocks, and signals of the sensor portions in each block are read and output onto a corresponding horizontal read line 302. Signals on the horizontal read line 302 are transferred to an output amplifier 304 through a switching means 303, and output signals are extracted from an output terminal 305.

In a multi-line read system, when the number of sensors for one line is increased, the number of blocks and the number of horizontal read lines must be increased, resulting in a complex circuit arrangement.

SUMMARY OF THE INVENTION

It is an object of the present invention to provide an image sensor and a photoelectric conversion apparatus using the same, wherein signal access of one of the output lines and resetting of one or two or more other output lines can be simultaneously performed, i.e., simultaneous operations of signal access and resetting can be achieved, so that 100% output read access can be performed and a clock signal having a high frequency can be used.

It is another object of the present invention to provide an image sensor and a photoelectric conversion apparatus, wherein a plurality of output lines are arranged on one side of light-receiving elements, so that the circuit arrangement can be simplified, the circuit area can be reduced, and the chip size is reduced accordingly.

It is still another object of the present invention to provide an image sensor and a photoelectric conversion apparatus capable of providing a sensor unit having a high S/N ratio by (1) increasing signal read efficiency by a decrease in parasitic capacitance of a horizontal read line and (2) setting a signal read time for the horizontal read line to be longer than that for an output terminal to obtain an increase in signal read efficiency, e.g., by setting $t1 = 2t2$.

DETAILED DESCRIPTION OF THE PREFERRED EMBODIMENTS

The present invention has been made to solve the conventional problems described above and achieve the above objects.

In an image sensor and a photoelectric conversion apparatus according to the present invention, pixel signals from a plurality of light receiving elements are output to a plurality of output lines, and a switching means is turned on by one of the plurality of output lines to read output signals onto a common output line. At the same time, switching means for one or two or more other output lines are turned off to turn on a reset means. Therefore, the output lines other than the common output line are reset, thus simultaneously performing signal read access and resetting.

According to the present invention, an output line is divided into four output lines. Each divided output line is connected to every four sensor portions through four first-stage switching means to decrease a parasitic capacitance of each divided output line and increase read efficiency.

At the same time, two of the divided output lines are commonly connected through the corresponding two second-stage switching means, so that a time for reading signals from each sensor portion to each divided output line can be prolonged as compared with a conventional arrangement. Therefore, read efficiency can be further increased. Read efficiency can be increased without increasing the number of divided output lines, and complexity of the circuit arrangement can be prevented.

An embodiment of the present invention will be described in detail with reference to the accompanying drawings.

Figure 4:
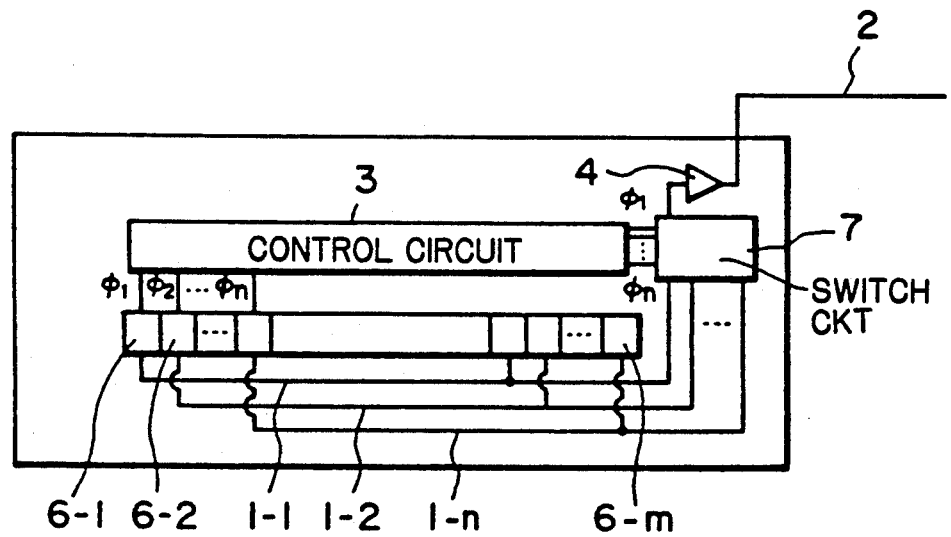
FIG. 4 is a view showing an arrangement of an image sensor chip in a photoelectric conversion apparatus according to an embodiment of the present invention.

FIG. 4 illustrates a circuit of an image sensor in a photoelectric conversion apparatus according to a preferred embodiment of the present invention.

Figure 1:
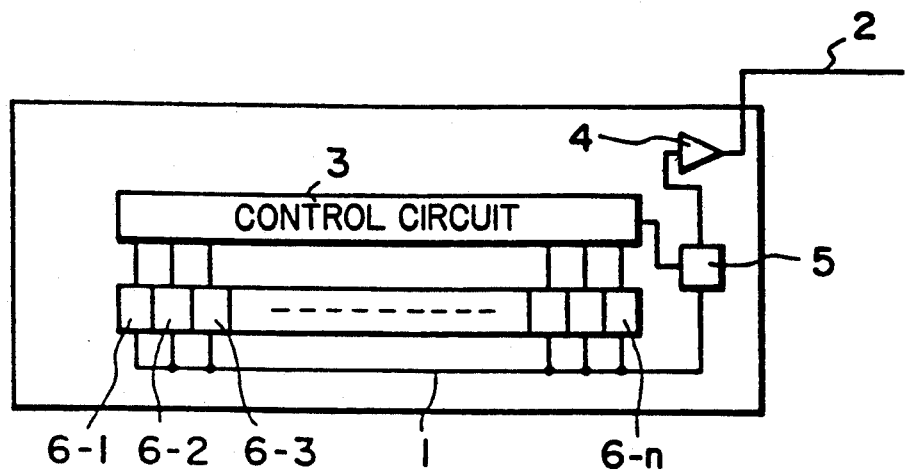
FIG. 1 is a view showing a circuit arrangement of a conventional image sensor chip.
Figure 2A:
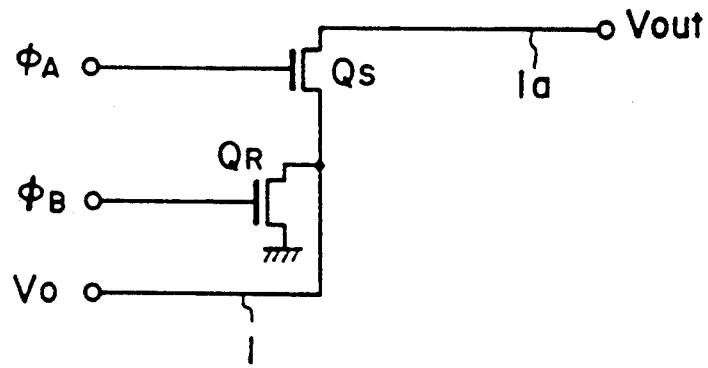
FIG. 2A is a circuit diagram showing a detailed arrangement of a reset circuit.
Figure 2B:
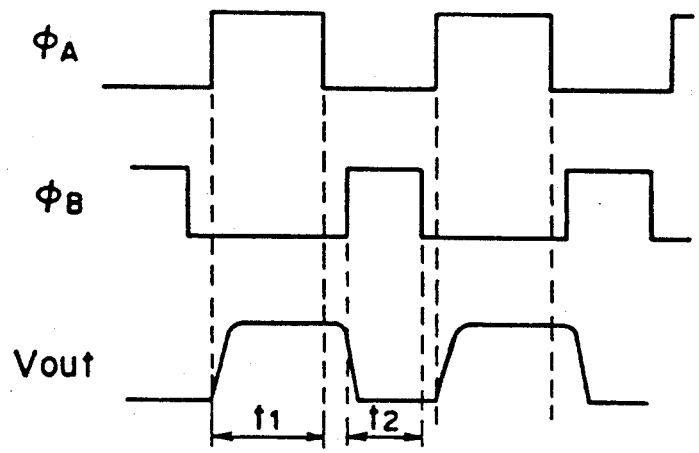
FIG. 2B is a timing chart showing waveforms of signals for driving the reset circuit and a waveform of an output signal therefrom.
Figure 3:
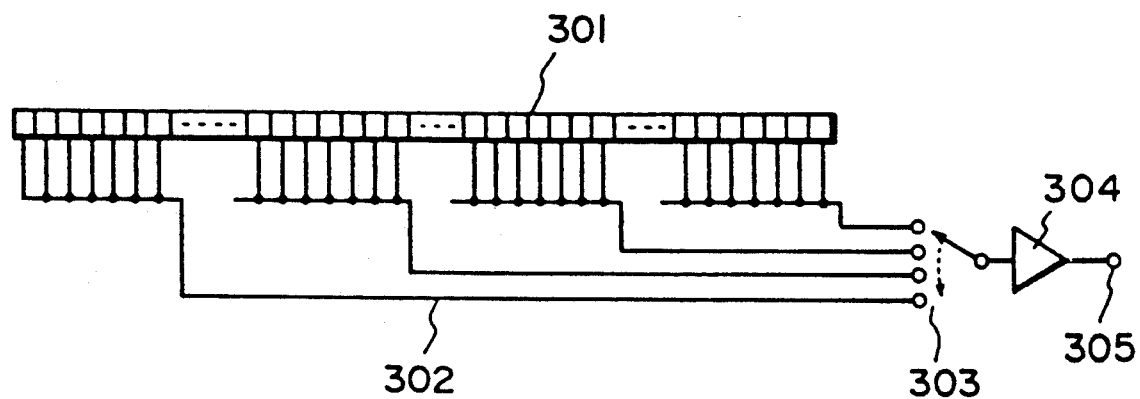
FIG. 3 is a schematic view showing an arrangement of a multi-line read system.

The same reference numerals as in FIG. 1 denote the same parts in FIG. 4.

As shown in FIG. 4, n-phase clock pulses $\phi 1, \phi 2, ..., \phi n$ of a fundamental clock signal are respectively supplied from a control circuit 3 to light-receiving elements 6-1, 6-2,..., 6-m (m = xn; x is an integer) and sensor signals are output onto independent output lines 1-1, 1-2,... 1-n, respectively.

The output lines 1-1, 1-2,..., 1-n are connected to an analog switch circuit 7 having a reset circuit. An output line for reading a signal to a light signal amplifier 4 and a resetting output line are selected by the n-phase clock pulses $\phi 1, \phi 2, ..., \phi n$ from the control circuit 3. Therefore, signal read access and resetting are simultaneously performed. A signal amplified by the light signal amplifier 4 is output onto a common output line 2. With this operation, signal read access having a duty ratio of 100% or almost 100% can be performed.

The plurality of output lines of the image sensor are arranged on one side of the array of the light-receiving elements. Therefore, the circuit arrangement can be simplified, the circuit area can be reduced, and the chip size can be reduced accordingly.

The arrangement of the analog switch circuit will be described below. For the sake of descriptive simplicity, two-phase clock pulses will be exemplified.

Figure 5A:
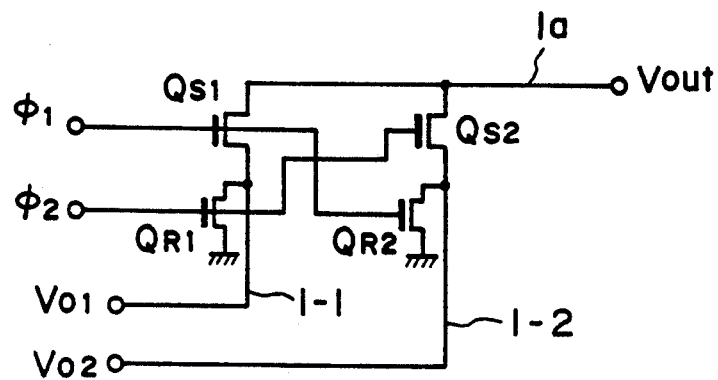
FIG. 5A is a circuit diagram showing an arrangement of an analog switch circuit having a reset circuit.

FIG. 5A is a circuit diagram showing an arrangement of the analog switch circuit having a reset circuit.

Figure 5B:
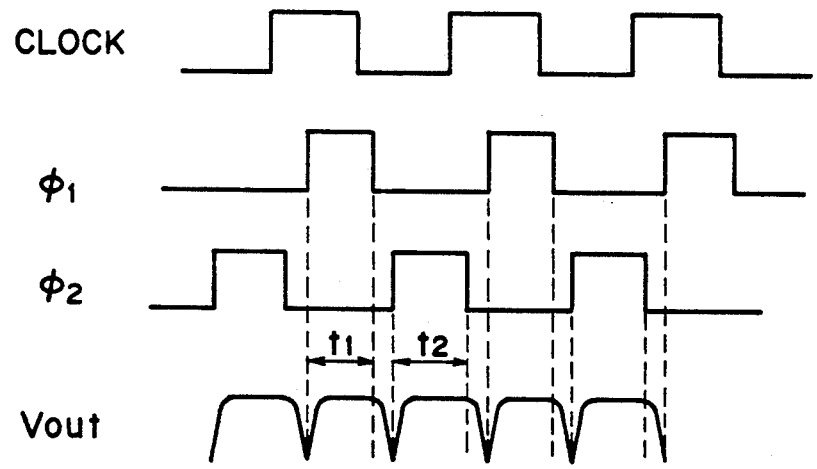
FIG. 5B is a timing chart showing waveforms of signals for driving the analog switch circuit and a waveform of an output signal from the analog switch circuit.

FIG. 5B is a timing chart showing waveforms of signals for driving the analog switch circuit and a waveform of an output signal from the analog switch circuit.

Referring to FIG. 5A, a reset transistor QR1 is connected to the output line 1-1, and a reset transistor QR2 is connected to the output line 1-2. The output line 1-1 is connected to a transistor QS1. An input pulse $\phi 1$ is input to the gate electrodes of the transistors QS1 and QR2. The output line 1-2 is connected to the transistor QS2, and an input pulse $\phi 2$ is input to the gate electrodes of the transistors QS2 and QR1.

A drive operation of the analog switch circuit will be described below.

Referring to FIG. 5B, of the two-phase clock pulses $\phi 1$ and $\phi 2$ generated by the fundamental clock signal, the clock pulse $\phi 1$ is kept ON during a time interval t1, and the clock pulse $\phi 2$ is kept OFF during this interval. In this state, the transistors QS1 and QR2 are kept ON, and the transistors QS2 and QR1 are kept OFF. For this reason, a pixel signal VO1 is output from the output line 1—1 to the common output line 1a through the transistor QS1. The output line 1-2 is reset by the transistor QR2. Since the transistor QS2 is kept OFF in this state, only the pixel signal V01 output to the output line 1—1 is read as an output signal Vout.

During a time interval t2, the clock pulse $\phi 2$ is kept ON, while the clock pulse $\phi 1$ is kept OFF. In this state, the transistors QS2 and QR1 are kept ON, and the transistors QS1 and QR2 are kept OFF. The output line 1-2 is reset during the time interval t1, and a pixel signal V02 upon resetting of the output line 1-2 is read onto the common output line 1a through the transistor QS2. The output line 1—1 is reset by the transistor QR1. At this time, since the transistor QS1 is kept OFF, the output line 1a is not influenced by the transistor QS1, and only the pixel signal V02 read onto the output line 1-2 appears as the output signal Vout.

The above operation is repeated.

As has been described above according to this embodiment, in the image sensor and the photoelectric conversion apparatus, signal access of one of the output lines and resetting of one or two or more other output lines can be simultaneously performed, i.e., simultaneous operations of signal access and resetting can be achieved, so that 100% or almost 100% duty-ratio output read access can be performed and a clock signal having a high frequency can be used.

Since the plurality of output lines are arranged on one side of the array of the light-receiving elements, the circuit arrangement can be simplified, the circuit area can be reduced, and the chip size can be reduced accordingly.

Another embodiment of the present invention will be described in detail with reference to the accompanying drawings.

Figure 6:
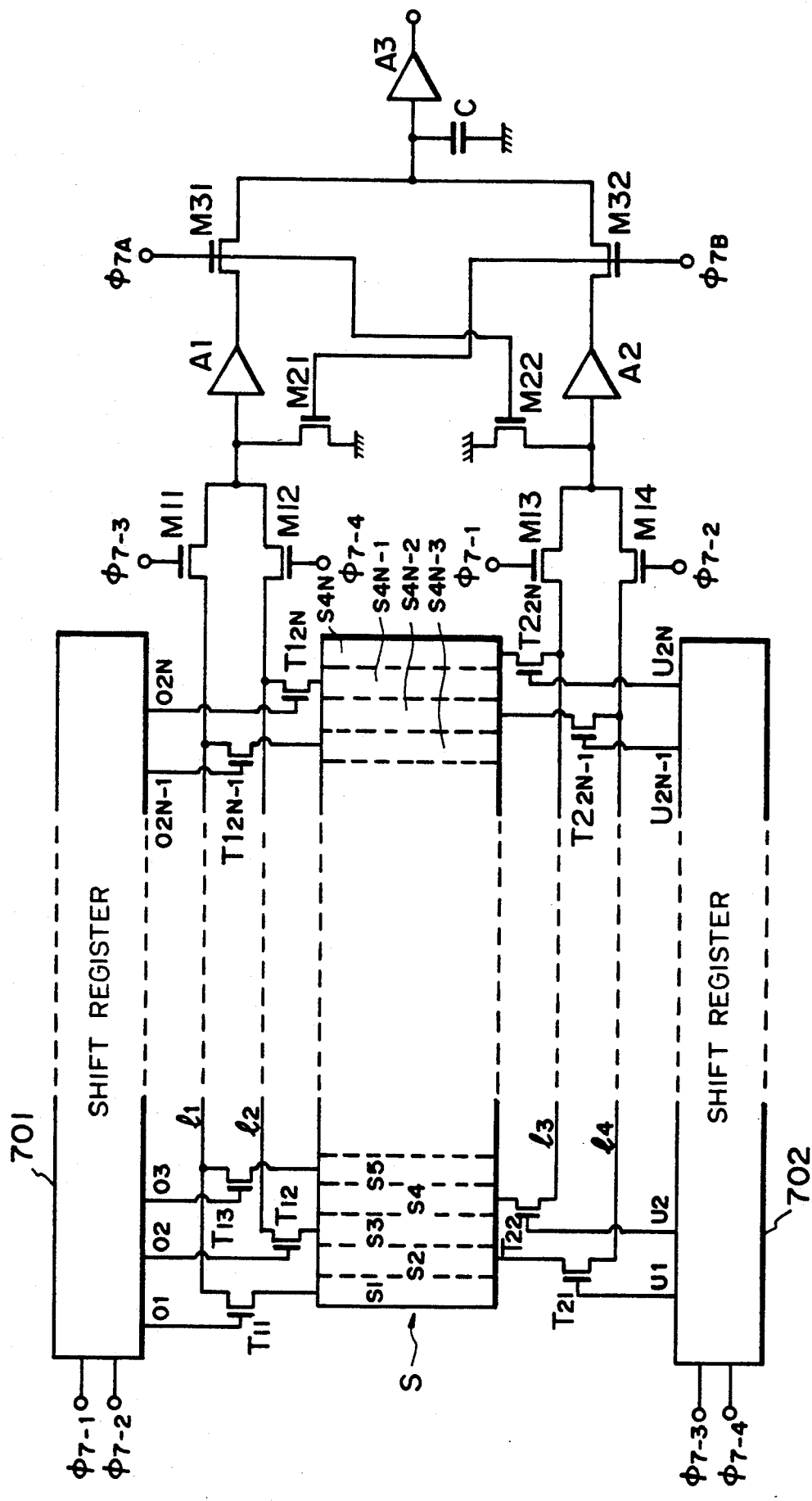
FIG. 6 is a schematic circuit diagram for explaining a photoelectric conversion apparatus according to another embodiment of the present invention.

FIG. 6 is a schematic view showing a sensor unit according to the present invention.

Referring to FIG. 6, shift registers 701 and 702 are arranged on both sides of a one-dimensional sensor array S. The shift register 701 is driven at timings determined by clock pulses $\phi7-1$ and $\phi7-2$. The shift register 702 is driven at timings determined by clock pulses $\phi7-3$ and $\phi7-4$.

A control signal corresponding to the clock pulse $\phi7-1$ is output from output terminals 01, 03,..., 02N-1 (N: a predetermined integer; this definition will apply to the following description). MOS transistors $T1_1$, $T1_3$,..., $T1_{2N-1}$ are ON/OFF-controlled by this control signal. Similarly, a control signal corresponding to the clock pulse $\phi2$ is output from output terminals O2, O4,..., 02N, and MOS transistors $T1_2$, $T1_4$,..., $T1_{2N}$ are ON/OFF-controlled by this control signal.

A control signal corresponding to the clock pulse $\phi7-3$ is output from output terminals U1, U3,..., U2N-1 of the shift register 702, and MOS transistors $T2_1$, $T2_3$,..., $T2_{2N-1}$ are ON/OFF-controlled by this control signal. Similarly, a control signal corresponding to the clock pulse $\phi7-4$ is output from output terminals U2, U4,..., U2N, and MOS transistors $T2_2$, $T2_4$,..., $T2_{2N}$ are ON/OFF-controlled by this control signal.

Sensor portions S1, S5,..., S4N-3 are connected to the MOS transistors $T1_1$, $T1_3$,..., $T1_{2N-1}$, respectively, and the MOS transistors $T1_1$ to $T1_{2N-1}$ are connected to a horizontal read line 11.

Sensor portions S3, S7,..., S4N-1 are connected to the MOS transistors $T1_2$, $T1_4$,..., $T1_{2N}$, respectively, and the MOS transistors $T1_2$ to $T1_{2N}$ are connected to a horizontal read line 12.

Sensor portions S2, S6,..., S4N-2 are connected to the MOS transistors $T2_1$, $T2_3$,..., $T2_{2N-1}$, respectively, and the MOS transistors $T2_1$ to $T2_{2N-1}$ are connected to a horizontal read line 14.

Sensor portions S4, S8,..., S4N are connected to the MOS transistors $T2_2$, $T2_4$,..., $T2_{2N}$, respectively, and the MOS transistors $T2_2$ to $T2_{2N}$ are connected to a horizontal read line 13.

The horizontal read lines 11 and 12 are commonly connected through the MOS transistor $Ml_1$ and $M1_2$ and to the MOS transistor $M2_1$ and an amplifier A1. The MOS transistors $M1_1$ and $M1_2$ are ON/OFF-controlled by the clock pulses $\phi7-3$ and $\phi7-4$.

Similarly, the horizontal read lines 13 and 14 are commonly connected through the MOS transistor $M1_3$ and $M1_4$ and to the MOS transistor $M2_2$ and an amplifier A2. The MOS transistors $M1_3$ and $M1_4$ are ON/OFF-controlled by the clock pulses $\phi7-1$ and $\phi7-2$.

The gate of the MOS transistor $M2_1$ is connected to the gate of the MOS transistor $M3_2$, and a pulse $\phi7B$ is input to these gates. Similarly, the gate of the MOS transistor $M2_2$ is connected to the gate of the MOS transistor $M3_1$, and a pulse $\phi7A$ is input to these gates.

The sources of the MOS transistors $M2_1$ and $M2_2$ are grounded, and the horizontal read lines 11 to 14 are reset in response to the pulses $\phi7A$ and $\phi7B$.

Outputs from the amplifiers A1 and A2 are commonly connected through the MOS transistors $M3_1$ and $M3_2$, respectively, and to an amplifier A3 and a capacitor C.

An operation of the sensor unit having the above arrangement will be described with reference to FIG. 7.

Figure 7:
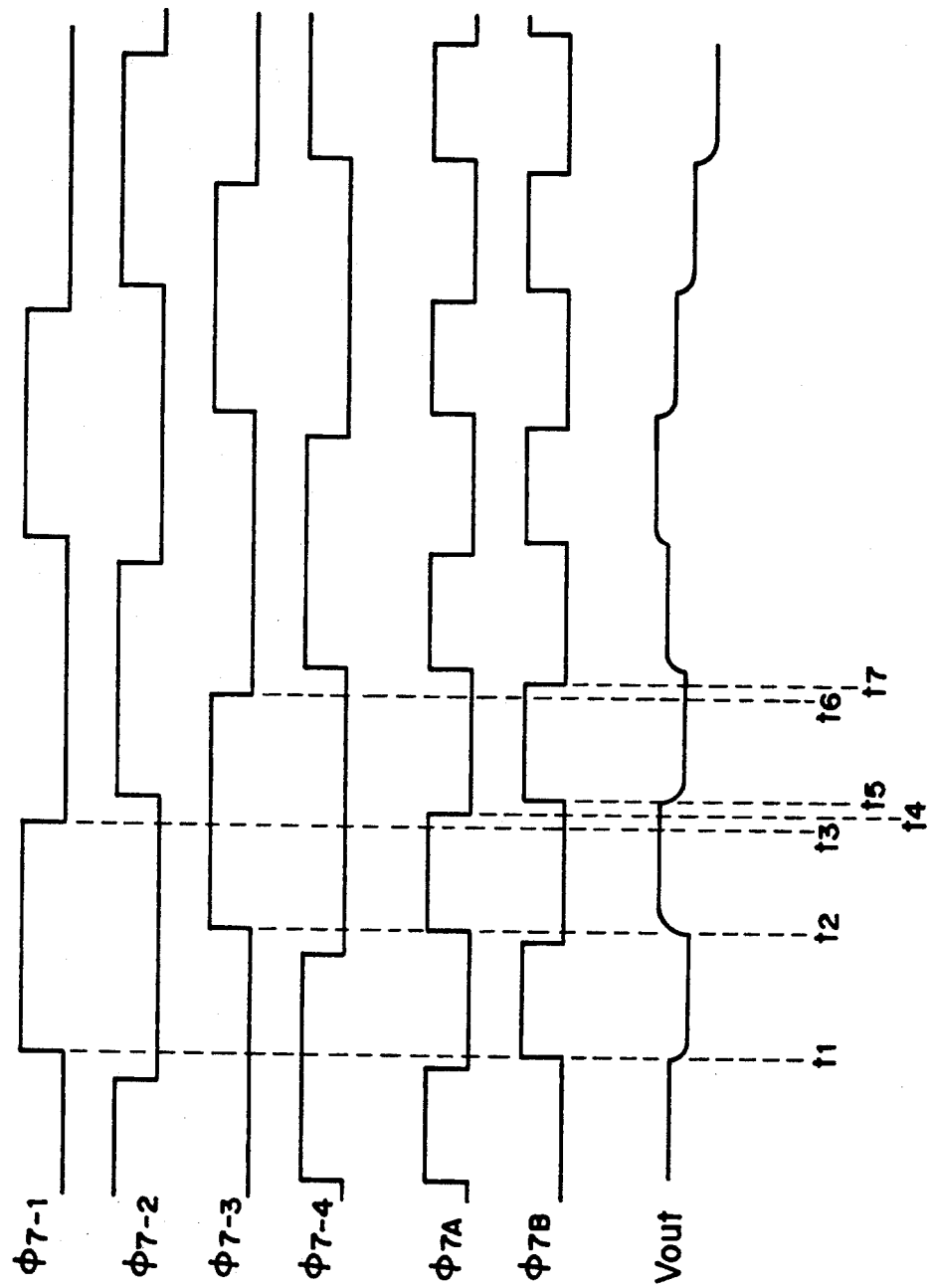
FIG. 7 is a timing chart for explaining an operation of the sensor unit according to the present invention.

FIG. 7 is a timing chart for explaining the operation of the sensor unit of this embodiment.

In the following description, read and reset operations of a signal from a sensor portion S1 will be exemplified. However, since the read and reset operations of the sensor portions S2, S4N, and S3 are partially performed, the read and reset operations of the corresponding portions will also be described.

At time t1, when a control signal corresponding to the clock pulse $\phi7-1$ is output from the output terminal O1 of the shift register 701, the MOS transistor $T1_1$ is turned on, and a charge stored in the sensor portion S1 is output to the horizontal read line 11.

At this time, since the clock pulse $\phi7-4$ is kept high and the clock pulse $\phi7B$ rises, the MOS transistors $M1_2$ and $M2_1$ are turned on, and the horizontal read line 12 is reset.

The clock pulses $\phi7-1$ and $\phi7B$ rise, and the MOS transistors $M1_3$ and $M3_2$ are turned on. The signal from the sensor portion S4N is sampled/held by the capacitor C and output from the amplifier A3.

At time t2, when the clock pulses $\phi7-3$ and $\phi7A$ rise, the MOS transistors $M1_1$ and $M3_1$ are turned on, and the signal from the sensor portion S1 is sampled/held by the capacitor C. An output VOUT is output from the amplifier A3.

At this time, since the clock pulse $\phi7-1$ is kept high and the clock pulse $\phi7A$ rises, the MOS transistors $M1_3$ and $M2_2$ are turned on, and the horizontal read line 13 is reset.

At time t3, when the clock pulse $\phi1$ falls, a control signal output from the output terminal O1 of the shift register 1 goes low. The horizontal read line 11 is disconnected from the sensor portion S1.

At time t4, when the clock pulse $\phi7A$ falls, the MOS transistor $M3_1$ is turned off, and the read operation of the signal output from the sensor portion S1 is completed. At this time, the clock pulse $\phi7-3$ is kept high, and the MOS transistor $M1_1$ is kept ON.

At time t5, when the clock pulse $\phi7B$ rises and the MOS transistor $M2_1$ is turned on, the horizontal read line 11 is reset because the MOS transistor $M1_1$ is kept ON.

At this time, when the clock pulses $\phi7-2$ and $\phi7B$ rise, the MOS transistors $M1_4$ and $M3_2$ are turned on, and the signal from the sensor portion S2 is sampled/held by the capacitor C and output from the amplifier A3.

When the clock pulse $\phi7-3$ falls at time t6 and the clock pulse $\phi7B$ falls at time t7, the transistors $M1_1$ and $M2_1$ are turned off to be ready for the next operation.

The series of read and reset operations are repeated in the order of the horizontal read lines 11, 14, 12, and 13. Serial signals from the sensor portions are sequentially output from the amplifier A3.

The signals from the sensor portion S1 appear on the output side of the amplifier A3 during a time interval between time t2 and time t3. However, a time interval for reading the signals from the sensor portion to the horizontal read line is a time interval between time t1 and time t3, which is twice the time interval between time t2 and time t3.

In the sensor of the sensor unit of this embodiment, sensor portions are aligned in an array, and sensor outputs are electrical signals. If these requirements are satisfied, the type of sensor is not limited to the photoelectric conversion element. A photoelectric conversion apparatus such as an image sensor is required to have a high resolution, and therefore the present invention can be effectively used for this application purpose.

An image reader whose sensor unit is an image sensor will be exemplified below.

Figure 8:
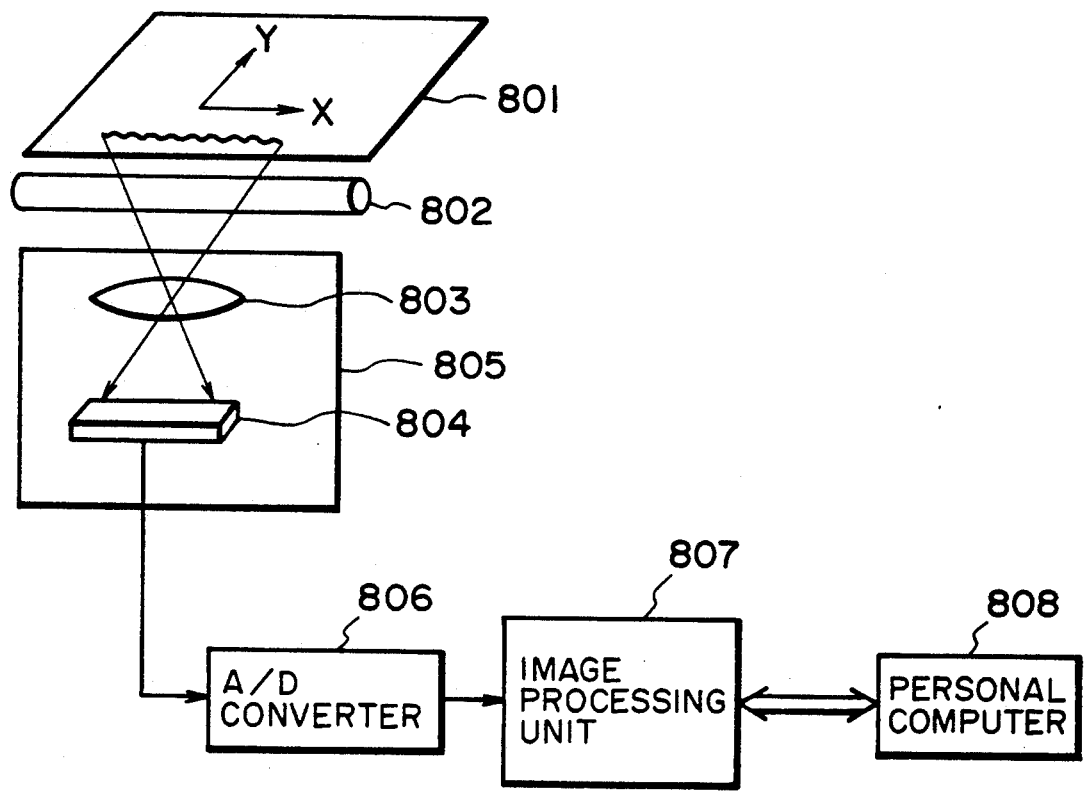
FIG. 8 is a schematic arrangement of an image reader.

FIG. 8 is a schematic view showing an arrangement of an image reader.

Referring to FIG. 8, an original 801 is mechanically moved relative to a reading section 805 in a direction of an arrow Y. Image reading can be performed by scanning the original 801 in a direction of an arrow X by an image sensor 804. Light from a light source 802 is reflected by the original 801, and the reflected light is focused on the image sensor 804 through a focusing optical system 803. Carriers corresponding to an intensity of incident light are accumulated in the image sensor 804 and photoelectrically converted into an image signal. The image signal is then output from the image sensor 804.

This image signal is converted into a digital signal by an A/D converter 806 and is stored in a memory of an image processing unit 807 as image data. Shading correction, color correction, and the like are performed, and the processed data is transmitted to a personal computer 808 or a printer.

When X-direction image signal transfer is completed as described above, the original 801 is moved relatively in the Y direction, and the above operations are repeated. The entire image of the original 801 can be converted into electrical signals and extracted as image information.

As described above in detail, the sensor unit of this embodiment has the following effects.

(1) The parasitic capacitance of the horizontal read line can be reduced, and signal read efficiency can be improved.

(2) The time for outputting signals onto horizontal read lines can be longer than the time of outputting signals to the output terminal, and signal read efficiency can be improved. For example, signal read efficiency can be improved by setting $t1 = 2t2$.

As a result, a sensor unit having a high S/N ratio can be obtained.

What is claimed is:

1. A sensor unit comprising:
   a plurality of sensor portions arranged in an array;
   four output lines connected electrically and commonly to each of four of said sensor portions;
   a plurality of first stage switching means connected respectively to said output lines;
   a plurality of second stage switching means to each one of which two of said first stage switching means are commonly connected;
   a signal line connected to each of said switching means, for switching between said first and second stage switching means; and
   an amplifier to which a plurality of said second stage switching means are commonly connected,
   wherein a time for reading signals from said sensor portions to said output lines is twice a time for reading the signals from said second-stage switching means.

2. An image sensor chip comprising:
   a plurality of light-receiving elements arranged in at least two groups;
   a plurality of element output lines respectively connected to each of said groups, for outputting signals from said light-receiving elements;
   a plurality of switching means respectively connected to said plurality of element output lines for outputting signals;
   a plurality of reset means respectively connected to the plurality of said element output lines;
   wherein the switching means corresponding to one of said groups is electrically connected to the reset means corresponding to another of said groups, and wherein one particular switching means connected to one of said element output lines which corresponds to one of said groups, and one particular reset means connected to another of said element output lines which corresponds to another of said groups are electrically connected, said particular switching means and said particular reset means being simultaneously driven.

3. A chip according to claim 2, wherein said plurality of element output lines are arranged on one side of an array of said plurality of light-receiving elements.

4. An image sensor according to claim 2, wherein said reset means includes transistors.

5. A photoelectric conversion apparatus having a plurality of image sensor chips each having an array of light-receiving elements, the light-receiving elements of each array being arranged in at least two groups, each said image sensor chip comprising:
   a plurality of element output lines respectively coupled to each of the groups, for outputting signals from said plurality of light-receiving elements;
   a plurality of switching means to which said element output lines are respectively connected;
   a common output line commonly connected to said plurality of switching means, for commonly outputting outputs from said plurality of switching means;
   a plurality of reset means connected respectively to said plurality of element output lines, wherein said switching means corresponding to one of said groups is electrically connected to said reset means corresponding to another of said groups; and
   a control circuit producing a signal for simultaneously driving a particular one of said switching means and a particular one of said reset means to simultaneously read a signal from one element output line while refreshing another element output line.

6. An apparatus according to claim 5, wherein said plurality of element output lines are arranged on one side of the array of said light-receiving elements.

7. A photoelectric conversion apparatus according to claim 5, wherein said reset means includes transistors.

8. A sensor unit comprising:
   a plurality of sensor portions arranged in an array;
   four output lines connected electrically and commonly per each four of said sensor portions;
   a plurality of first stage switching means connected respectively to said output lines, first stage switching means comprising two groups each including two first stage switching means commonly connected;
   a plurality of second stage switching means each of which is electrically connected to one of the two groups of said first stage switching means;
   a signal line connected to each of said switching means, for switching between said first and second stage switching means; and
   an amplifier to which a plurality of said second stage switching means are commonly connected.

9. A sensor unit according to claim 8, wherein the sensor array comprises four groups of sensors, and wherein said plurality of output lines comprise four output lines, and further comprising:
- a signal line connected to each of said switching means, for switching between said first and second stage switching means; and
- an amplifier to which a plurality of said second stage switching means are commonly connected.

10. A sensor unit comprising:
- a plurality of sensor portions arranged in an array;
- four output lines connected electrically and commonly to each of four of said sensor portions;
- a plurality of first stage switching means connected respectively to said output lines;
- a plurality of second stage switching means to each one of which two of said first stage switching means are commonly connected;
- a signal line connected to each of said switching means, for switching between said first and second stage switching means;
- an amplifier to which a plurality of said second stage switching means are commonly connected; and
- a control circuit producing a signal for driving said first and second stage switching means, so that a time period for reading signals from said sensor portions to said output lines is longer than a time period for reading signals from said second stage switching means.

11. A sensor unit comprising:
- a plurality of sensor portions arranged in an array;
- a plurality of output lines connected to said sensor portions, in a predetermined order, commonly;
- a plurality of first stage switching means connected respectively to said output lines;
- a plurality of second stage switching means, to each of which n of said first stage switching means are commonly connected, where n is a predetermined integer;
- a plurality of reset means to which n of said first stage switching means are commonly connected; and
- a plurality of signal lines for electrically connecting said second stage switching means corresponding to one of said output lines, with said reset means corresponding to other output lines not associated with said second switching means to drive them simultaneously.

12. A sensor unit according to claim 11, wherein said second switching means are commonly connected in a line.

13. A sensor unit according to claim 11, wherein n is 2.

14. A sensor unit according to claim 11, wherein said output lines connected respectively to sensor portions of odd and even orders in the sensor array are provided respectively at opposite sides of said sensor portions.

15. A sensor unit according to claim 11, wherein said first and second stage switching means and said reset means comprises transistors.

16. A sensor unit comprising:
- a plurality of sensors arranged in an array and comprising at least four groups of sensors;
- a plurality of output lines commonly connected to each group of said sensors;
- a plurality of first switching means respectively connected to said output lines;
- a plurality of second stage switching means and a plurality of reset means to which at least two of said first switching means are commonly connected;
- wherein said second stage switching means, corresponding to one of said groups and said reset means corresponding to another of said groups are electrically connected so that they are simultaneously driven.

* * * * *

UNITED STATES PATENT AND TRADEMARK OFFICE
CERTIFICATE OF CORRECTION

PATENT NO. : 5,262,870
DATED : November 16, 1993
INVENTOR(S) : KENICHI NAKAMURA, ET AL.

It is certified that error appears in the above-identified patent and that said Letters Patent is hereby corrected as shown below:

On title page, item
   [56] References Cited, under U.S. PATENT DOCUMENTS:
   "4,445,117  4/1989" should read --4,445,117  4/1984--.

<u>COLUMN 2</u>

Line 46, "are 5" should read --are--.

<u>COLUMN 5</u>

Line 35, "Tl$_2$N" should read --Tl$_{2N}$--.

<u>COLUMN 9</u>

Line 3, "comprise" should read --comprises--.

<u>COLUMN 10</u>

Line 22, "comprises" should read --comprise--.

Signed and Sealed this

Fifth Day of July, 1994

Attest:

BRUCE LEHMAN

*Attesting Officer*  *Commissioner of Patents and Trademarks*